United States Patent [19]
Garst

[11] 3,985,712
[45] Oct. 12, 1976

[54] METHOD AND APPARATUS FOR PREPARING INTERMEDIATE POLYESTER RESIN

[75] Inventor: John M. Garst, Blacklick, Ohio

[73] Assignee: Owens-Corning Fiberglas Corporation, Toledo, Ohio

[22] Filed: Feb. 12, 1975

[21] Appl. No.: 549,216

[52] U.S. Cl. ............................ 260/75 M; 165/12; 235/151.12; 236/15 B; 236/46 R; 165/12
[51] Int. Cl.[2] .................. G05B 21/00; C08G 63/12
[58] Field of Search ............... 236/46, 15 B; 432/18; 235/151.12; 23/230 A; 260/75 M, 75 UA

[56] References Cited
UNITED STATES PATENTS

| | | | |
|---|---|---|---|
| 3,311,303 | 3/1967 | Noyes | 236/46 |
| 3,392,914 | 7/1968 | Nienstaedt | 236/46 |
| 3,645,697 | 2/1972 | Hoffman, Jr. | 165/12 |
| 3,756,993 | 9/1973 | Green et al. | 23/230 A |

Primary Examiner—William E. Wayner
Attorney, Agent, or Firm—John W. Overman; Ralph J. Skinkiss

[57] ABSTRACT

A programmed method for the preparation of an intermediate polyester resin is disclosed. The process is monitored and controlled by a supervisory on line computer which supervises the three phases of the process: the charging phase; the temperature elevation phase and the cooking phase. During the critical temperature elevation phase the supervisory program assures that a runaway exothermic chemical reaction does not occur. This is accomplished by periodically reading batch temperature and comparing it with an emperically determined temperature time curve stored within the program. Heat input or removal is then ordered depending upon the relationship of the batch temperature and the temperature time curve.

3 Claims, 13 Drawing Figures

SEE FIG. 2d

METHOD AND APPARATUS FOR PREPARING INTERMEDIATE POLYESTER RESIN

FIELD OF THE INVENTION

Polyester resins have found extensive usefulness in the field of glass fiber reinforced plastics. Polyester resin, for example, is used in manufacture of sheet molding compounds as disclosed in commonly owned U.S. Pat. Nos. 3,615,979; 3,734,814, and 3,752,690. With increased manufacturing use of such materials in automobile parts, furniture and many other miscellaneous used it has become increasingly important to reduce processing time for manufacture of the intermediate polyester resin and thereby increase the efficiency of its manufacture and reduce its over all costs. The term intermediate polyester resin refers to that polyester resin supplied to manufacturers engaged in the fabrication of glass fiber reinforced plastic articles previously discussed. These manufacturers further process the intermediate resin into molding compounds suitable to their particular end use.

Intermediate polyester resin is basically produced by charging a reactor, or cooker, with at least one polyol, such as propylene glycol and at least one polybasic acid, such as maleic anhydride which is generally accompanied by a fluid carrier. These constituents are cooked in the reactor driving off the fluid carrier and causing chemical crosslinking of the constituents. Cooking of the constituents comprises raising the temperature of the charge to a cook temperature, which for polyester is approximately 430° F, and cooking the mixture at that temperature until the desired amount of chemical crosslinking has taken place. As the mixture is cooked and crosslinking occurs, its viscosity increases and acidity decreases. Termination of the cooking phase is thus a function of the viscosity and acidity of the mixture. During the cooking phase additional constituents may be added to the mixture in order to maintain the proper relationship between viscosity and acidity.

Raising the temperature of the constituents from room temperature to the cook temperature is a most critical process. It is a phenomenon of polyester resin that as chemical crosslinking occurs in exothermic heat is generated; if this exothermic heat is not compensated for or removed, it in turn causes additional crosslinking, which in turn generates further exothermic heat reducing still more crosslinking. The result is a runaway chemical reaction resulting in total crosslinking of the constituents and loss of the entire batch. Experience has shown that no two reactor charges are identical, because of varying specific heats from one charge to another the rate at which the charge temperature can be driven upward without causing a runaway reaction also varies. In the past, through trial and error, reactor operators came to know the safe temperature increases and corresponding heat inputs necessary to incrementaly raise the constituents to their cook temperature without inducing the runaway exothermic reaction. If a runaway reaction started they could do nothing but reduce heat input and hope for the reaction to burn itself out prior to total crosslinking.

SUMMARY OF THE INVENTION

The present invention solves the problem of the prior art by providing a programmed method for preparing an intermediate polyester resin in a minimum time without inducing the runaway exothermic reaction of the prior art. Total process time by my programmed method has been reduced from approximately thirty to fifteen hours.

In accord with my programmed method the total process is divided into three basic phases: the charge phase, the temperature elevation phase and the cook phase. The charge phase comprises, sequentially charging the reactor with a polyol and at least one polybasic acid including its fluid carrier. During the charging phase the weight of each constituent is monitored as it is added to the reactor. This weight is compared with optimum values stored in the computer. Reactor charging is stopped and placed in a hold status if the relative weight of any constituent being introduced to the reactor exceeds the optimum value stored in the computer. The reactor operator then takes necessary corrective measures to restore the process.

As the reactor is charged an initial chemical crosslinking occurs by virtue of the ingredients comming together. Therefore, the batch temperature is monitored by the program and compared to optimum values stored in the computer. In the event the batch temperature exceeds the optimum values, cooling of the reactor is commenced, thereby removing the excess exothermic heat.

The temperature elevation phase comprises two steps. During the first step maximum heat input is applied to the reactor driving the charge temperature upward toward the first distillate temperature which for intermediate polyester is approximately 350° F. This is the temperature at which the polybasic acid carrier fluid is volatilized. As the first distillate temperature is approached the program modulates the heat input downward so that when the batch reaches the first distillate temperature the heat input is not greater than that which has been emperically determined to be safe for progressing into the second and most critical step of the temperature elevation phase.

Elevation of batch temperture from first distillate to the cook temperature generates the greatest amount of constituent crosslinking activity. Therefore, it is during this process step that the greatest probability of experencing a runaway exothermic reaction exists.

By my programmed method heat input to the reactor is controlled as a function of actual batch temperature. Programmed incremental increases of heat input are applied provided the batch temperature follows the optimum temperature-time curve stored in the computer. In the event batch temperature falls outside programmed limits the advance of process time is halted until the batch temperature is brought back to within acceptable limits. The program determines the batch temperature trend and adjusts reactor heat input so that the batch temperature will return to the program set point temperature with minimum loss of time. In several situations the program may actually remove heat from the reactor in order to eliminate the excessive exothermic reactions.

Once the batch temperature reaches the cook temperature, the program estabilishes and maintains a relatively constant reactor heat input in order to maintain the programed cook temperature.

During the cook phase the reactor operator periodically samples the batch and determines the viscosity and acidity thereof. These values are then read into the program. The program stores the data as a time function and extropolates the data to future time periods by known curve fitting techniques. If the extropolations predict that the viscosity or acidity of the charge will fall outside acceptable limits the program then determines the amount of additional ingredients necessary to arrive at the process end point within limits. The process is completed when the polyester resin reaches a predetermined acidity and viscosity. The resin is then transferred to a thinning tank, mixed with styrene and stored until disposition thereof.

Other advantages and benefits of the present invention will be more fully understood from the following description of the preferred embodiment, and the drawings, a description of which follows.

DETAILED DESCRIPTION OF THE INVENTION

Figure 1:
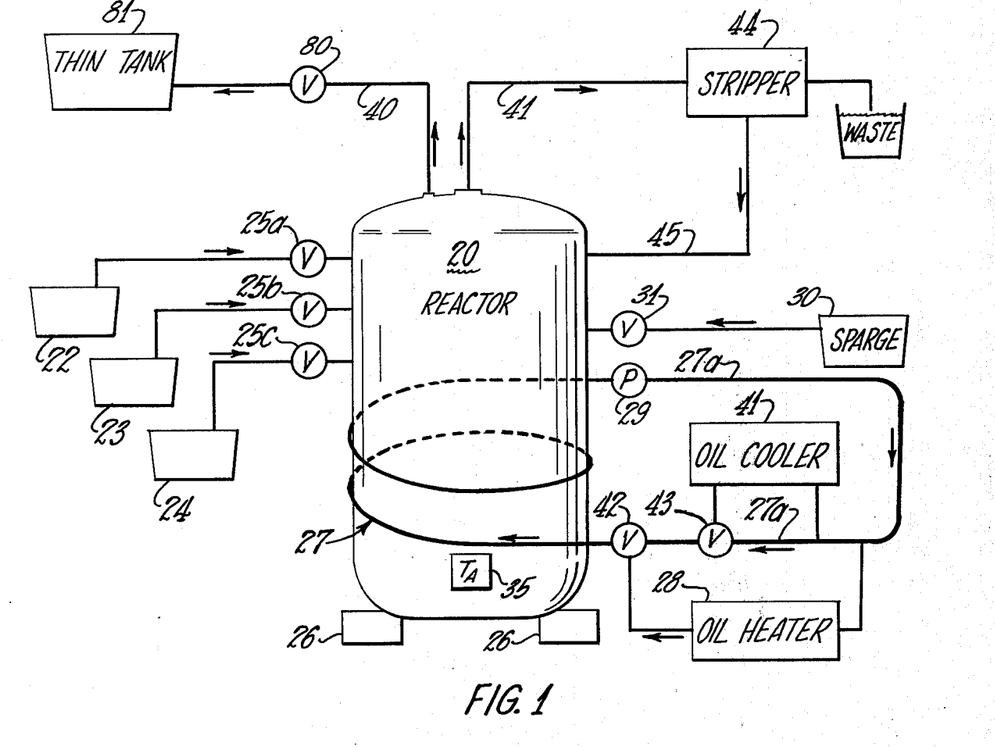
FIG. 1 is a schematic diagram of he apparatus for processing intermediate polyester resin according to the principals of my invention.

The apparatus required for preparation of intermediate polyester resin according to my invention is basically shown in FIG. 1. Reactor 20 is mounted on a plurality of load cells 26. The reactor is charged by constitutent supply means 22, 23, and 24 which individually charge their respective constitutents through program controlled valves 25 upon command from the computer. Pump 29 maintains a continuous flow of oil through heat transfer coils 27 and recirculation loop 27a. Heating or cooling of reactor 20 is accomplished by placing on line the oil heater 28 and/or oil-cooler 41 by the appropriate positioning of the three way valves 42 and 43 respectively.

Valves 42 and 43 are controlled by one computer output signal which by way of example ranges from 4 to 20 milliamperes (ma). Four ma corresponds to a "cold" reactor requiring maximum heat input to reactor 20 while a 20 ma signal corresponds to a "hot" reactor requiring maximum cooling. Valve 42 is calibrated fully open with respect to oil heater 28 at a 4 ma signal and closed at 13 ma. Similarly valve 43 is calibrated full open with respect to oil cooler 41 at 20 ma and closed at 11 ma. Thus for output signals within the range of 11 to 13 ma a tempered mixture of oil is circulated through heat transfer coils 27. By this technique one output signal controlls the amount heat input $Q_{in}$ to the reactor 20 and/or heat removal.

During normal operations when the batch temperature is within the programed set point limits the output signal to valves 42 and 43 is somewhat less than 11 ma. The oil cooler 41 is then off line by virtue of valve 43 being fully closed. Valve 42 now controls the temperature of oil circulating through coils 27 by mixing heated oil from oil heater 28 with the relatively cool recirculated oil of recirculation loop 27a. Oil cooler 41 is only placed on line as the need for cooling reactor 20 arises.

Stripper means 44 receives the volatilized vapors from reactor 20 via conduit means 41. From these vapors glycol is reclaimed and returned to the reactor via conduit means 45. The fluid carrier and sparge are rejected as waste from stripper 44.

Upon reaching the process end point the batch is removed from reactor 20 via a conduit means 40 through computer controlled valve 80 and deposited in the thinning tank 81 for post-cooking processing.

Figure 2A:
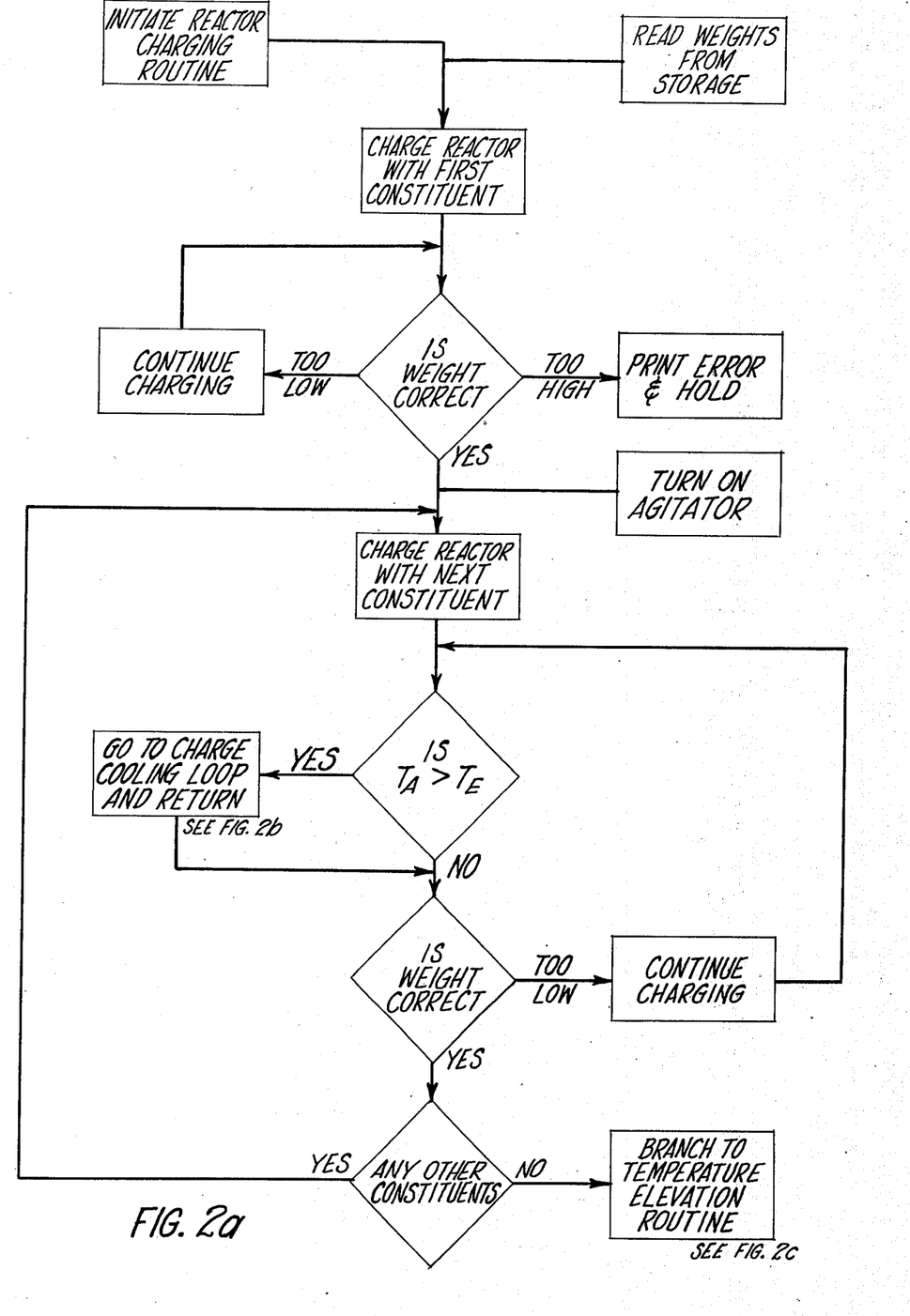
FIGS. 2a–2f are a series of process flow charts describing the sequence of events in accord with my invention.
Figure 2B:
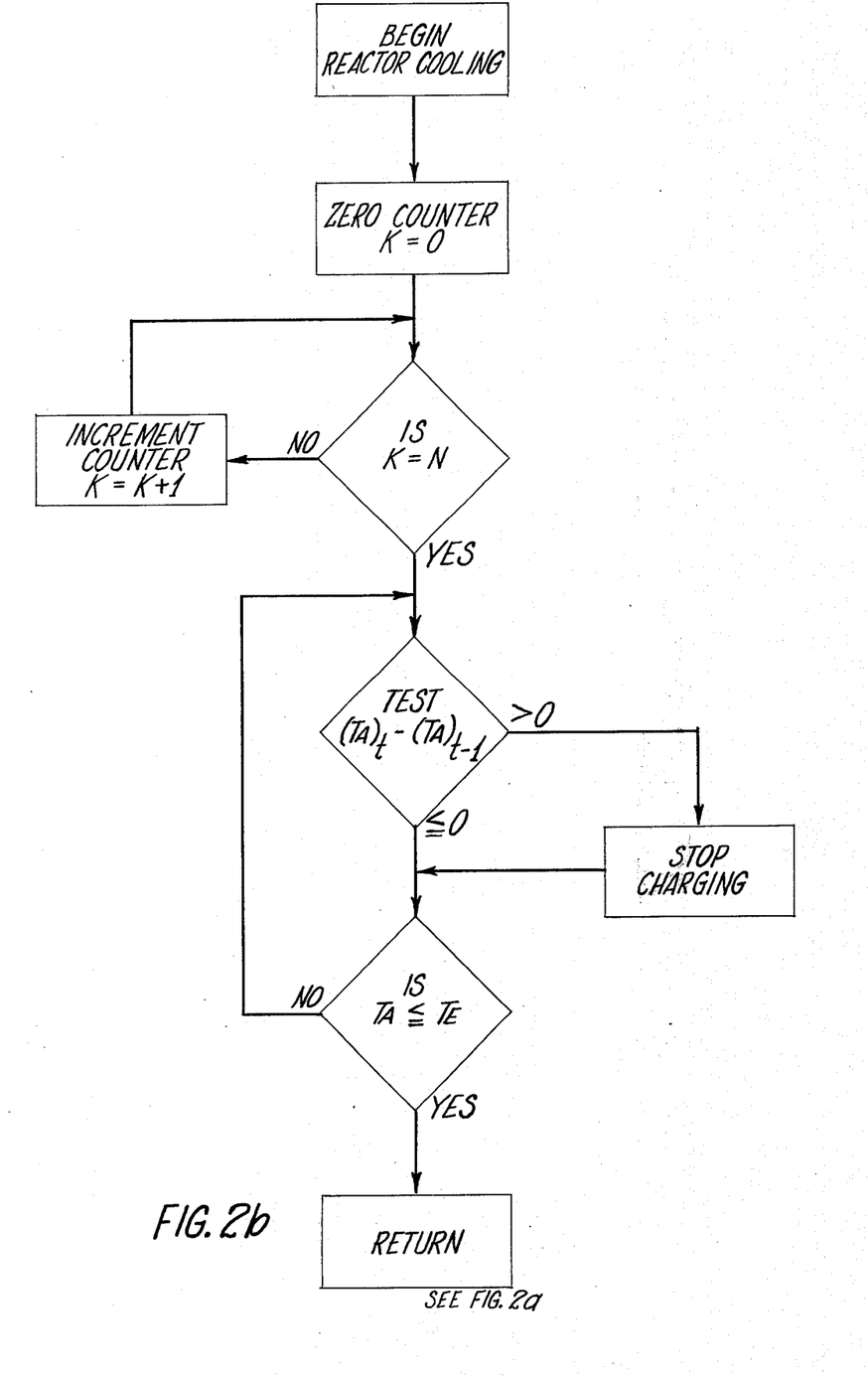
Figure 2C:
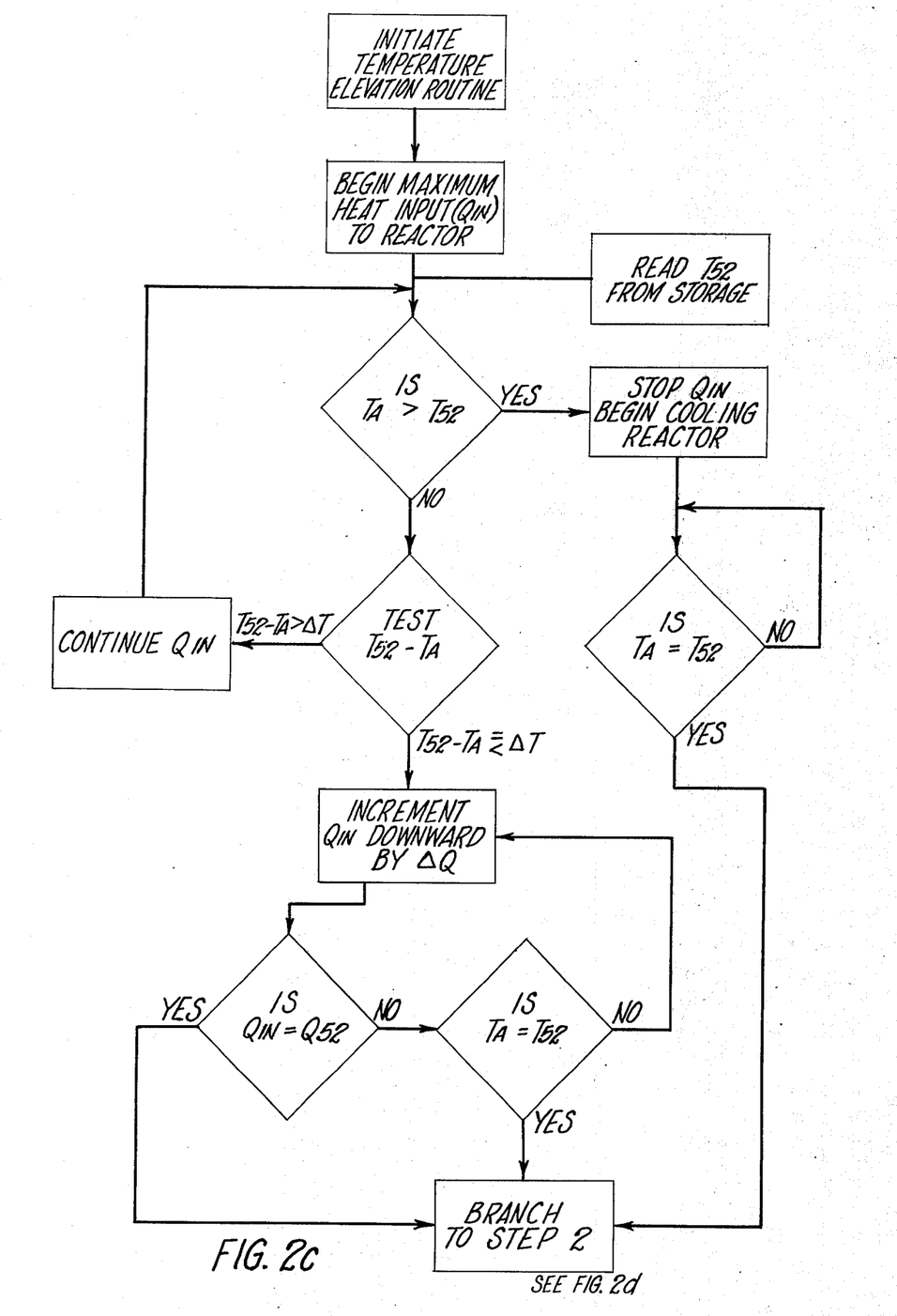
Figure 2D:
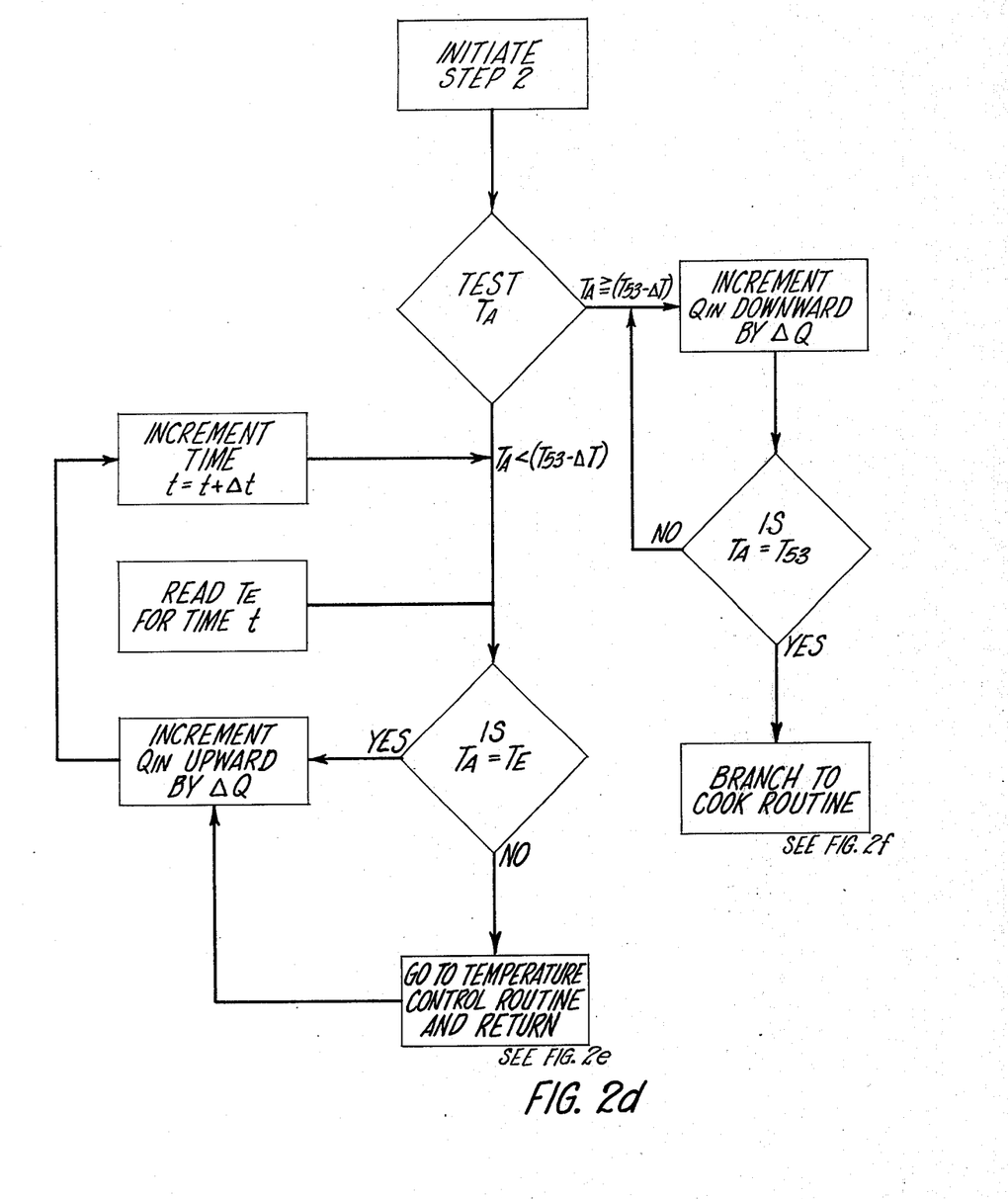
Figure 2E:
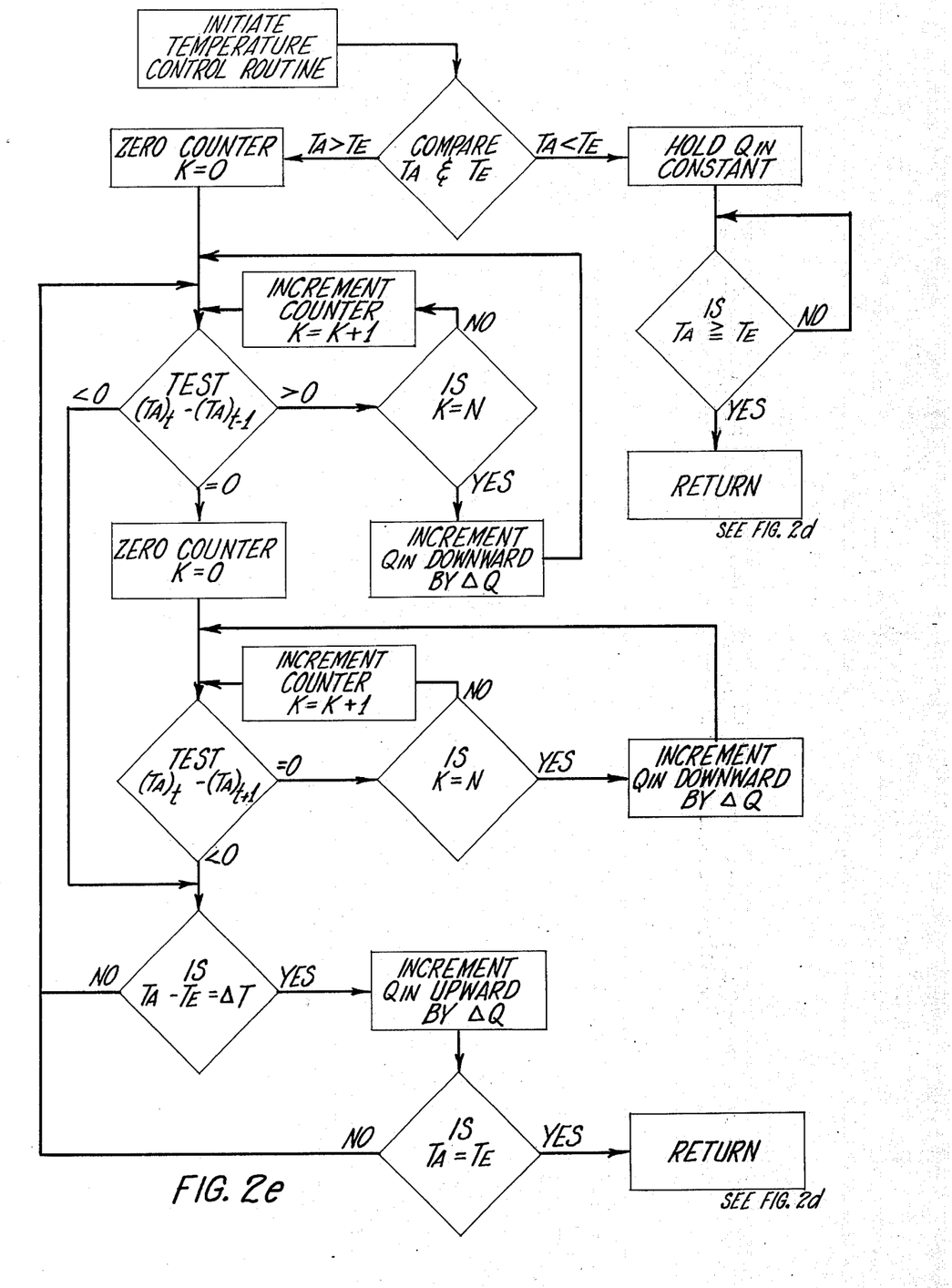
Figure 2F:
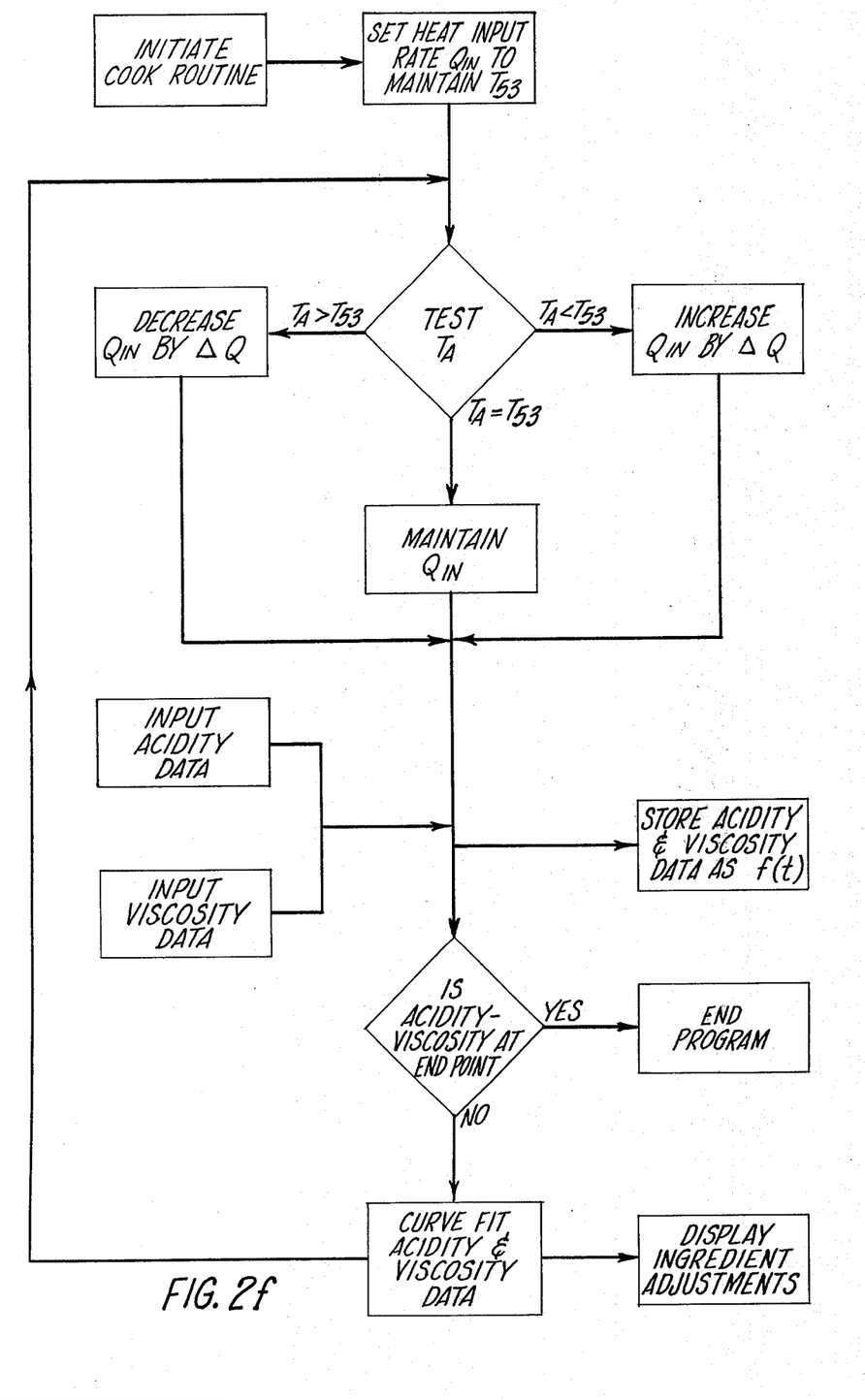
Figure 3:
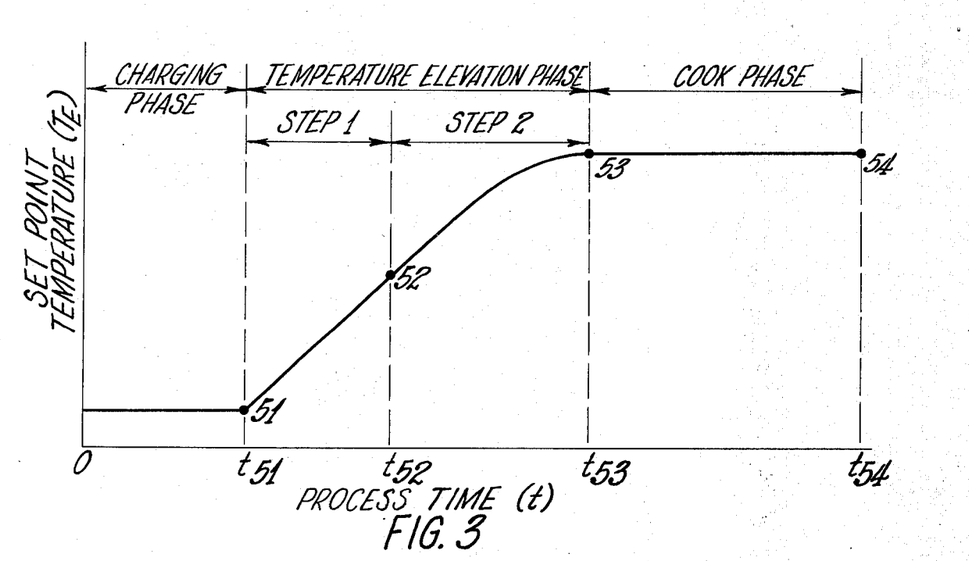
FIG. 3 is a representative curve of reactor set point temperature vs. process time.
Figure 4:
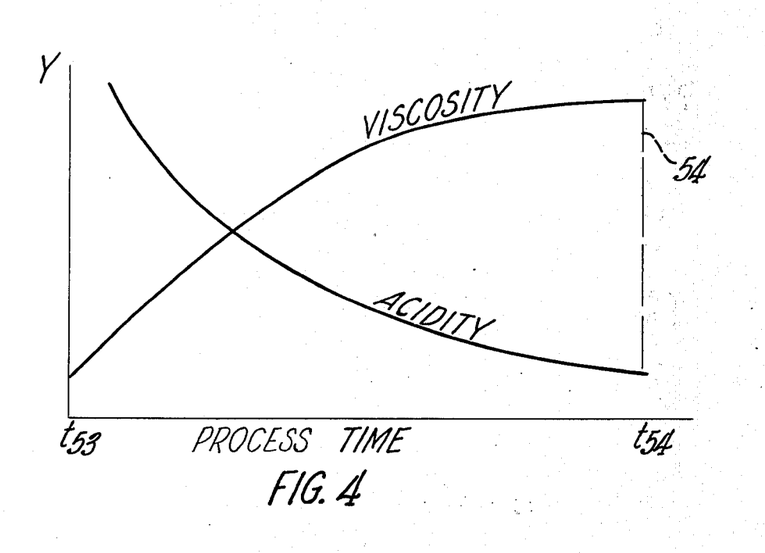
FIG. 4. is a graphical illustration showing the general trend of batch viscosity and acidity as a function of process time during the cooking phase.

Now with reference to FIGS. 1 through 3, the process is initiated by the opening of valve 25a upon command of the computer. Reactor 20 is thereby first charged with a polyol, such as propylene glycol, from storage means 22. The total weight of the reactor and the polyol is measured by a plurality of load cells 26. Said weight data is continuously monitored by the program. When the weight of the polyol transferred into the reactor equals the desired weight, stored in the program, the computer orders valve 25a closed.

Before ordering addition of the next ingredient, the computer opens valve 31 thereby intitiating an enert gas sparge 30 to cause mixing of the charge as the next ingredient is added. A suitable sparge is nitrogen gas which is bubbled upward through the charge agitatingly mixing the constituents. The gas sparge is continued throughout the total processing time. A mechanical agitator might also be activated as an alternative to or in conjunction with the gas sparge.

The program now calls for addition of the second ingredient to the reactor. The computer orders valve 25b open causing the polybasic acid to flow from storage means 23 into the reactor 20. Suitable acids used in the preparation of an intermediate polyester resin are, for example, maleic anhydride, phthalic anhydride, and isophthalic anhydride.

Such polybasic acids generally include a fluid carrier. Again the program monitors the total weight of the reactor 20 measured by the load cells 26 and therefrom computes the weight of the polybasic acid added. When the desired weight has been added, in accord with values stored in the program, the computer closes valve 25b. If an additional ingredient is to be entered as depicted by storage means 24 the computer opens valve 25c and similarily regulates the weight of said ingredient added to the reactor. While only three ingredients are depicted, it is understood any number of ingredients might be charged in this manner. As mixing of the constituents progresses during the charge phase an initial chemical reaction or crosslinking occurs causing generation of exothermic heat. Therefore, the actual temperature $T_A$ of the constituents is measured by temperature measuring means 35, such as a thermocouple; said temperature is continuously monitored by the program and compared to the empirically determined set point temperature $T_E$ stored in the computer, see FIG. 2a.

FIG. 3 depicts a typical curve showing reactor set point temperature as a function of process time. This curve has been empirically determined by analyizing data from prior non-program controlled operations and is necessarily subject to adjustment as more experience is gained and recorded data analyzed.

The set point temperature curve of FIG. 3 is stored in the program with appropriate plus and minus tolerances. Hence for discussion purposes when temperature $T_E$ is referred to it is to be understood as the temperature range defined by the set point temperature plus or minus its programmed tolerance for a given process time ($t$). The temperature tolerance or limits may vary as a function of process time or they may be programmed as constant values.

If while mixing of the ingredients during the charge phase exothermic reactions cause the charge temperature $T_A$ to exceed the reactor set point temperature of $T_{51}$ the program begins cooling of the reactor to remove exothermic heat and bring the charge temperature $T_A$ back to the set point of $T_{51}$. This may be accomplished most simply by applying maximum cooling to reactor 20, or some lesser cooling rate may be programmed proportional to the extent of temperature over run. FIG. 2b shows the sequence of events for applying maximum cooling.

After the program enters the cooling loop, FIG. 2b, and maximum cooling is initiated the program provides for a passage of time to allow said cooling to take affect. This might be accomplished by a counter, as shown in FIG. 2b, which is incremented upon each periodic sweep of the program. When the counter K equals a predetermined value N the program than compares the actual charge temperature at that time $(T_A)_t$ to the previously recorded temperature $(T_A)_{t-1}$. If the temperature is continuing to rise charging of the reactor is stopped until the charge temperature returns to acceptable limits. Once the charge temperature has returned to acceptable limits the program resumes charging reactor 20 until full looded as depicted in FIG. 2a.

Once reactor 20 is fully loaded the program advances to the temperature elevation phase which begins at point 51 in FIG. 3 and ends at point 52. This phase comprises two steps. Step 1 raises the batch temperature $T_A$ from the charging temperature $T_{51}$ to the first distillate temperature $T_{52}$. For intermediate polyester resins the first distillate temperature is approximately 350° F.

During the first step of the temperature elevation phase little risk of experiencing a runaway exothermic reaction exists, therefore, maximum heat input $Q_{in}$ is applied to the reactor thereby driving the batch temperature to the first distillate in the shortest possible time. As the batch temperature rises the fluid carrier of the polybasic acid begins to vaporize. Stripper means 44 receives the vapor, reclaims the glycol present and returns it to reactor 20. The fluid carrier and sparge are ejected as waste.

During the initial temperature elevation step the program continuously monitors batch temperature $T_A$. While the batch temperature $T_A$ is driven upward to $T_{52}$ the program continuously compares $T_A$ to $T_{52}$. In the event $T_A$ exceeds $T_{52}$ the program terminates reactor heat input $Q_{in}$ and begins cooling the reactor.

When the batch temperature $T_A$ is within a given $\Delta T$ of the first distillate temperature $T_{52}$ the program begins to reduce reactor heat input $Q_{in}$ by incremented amounts $\Delta Q$. Whenever heat input $Q_{in}$ and batch temperature $T_A$ reach the set point values for point 52 step 2 of the temperature evaluation phase is commenced.

Step 2 is not begun unless the charge temperature $T_A$ is within programmed limits.

Raising the batch temperature $T_A$ from the first distillate temperature $T_{52}$ to the cook temperature $T_{53}$ is the most critical portion of the total process. It is between these process points that the greatest possiblity of experiencing a runaway exothermic reaction exists. By my programmed process the batch temperature $T_A$ is elevated from $T_{52}$ to the cook temperature $T_{53}$ by sequentially incrementing the reactor heat input $Q_{in}$ upward by a given $\Delta Q$ for each process time step. The program reads $T_A$ at each time step and compares it to the programmed set point $T_E$ for that time step. Ideally $T_A$ sould follow the $T_E$ profile of FIG. 3. However, because of variation in specific heat values from batch to batch, the actual batch temperature $T_A$ may lag the $T_E$ profile or, if excessive exothermic reactions occur $T_A$ may exceed the program upper limit of $T_E$. When the batch temperature $T_A$ deviates from the set point temperature $T_E$ the program stops advancing process time and returns $T_A$ to within acceptable limits. See FIGS. 2d and 2e.

Figure 5:
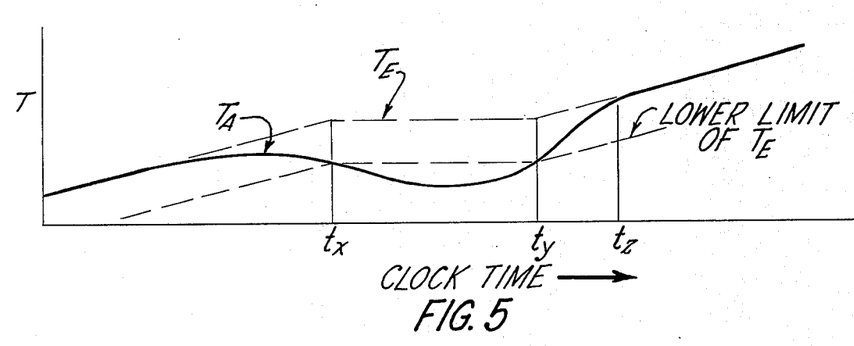
FIG. 5. is a graphical illustration depicting the condition where batch temperature lags the programmed set point temperature.
Figure 6:
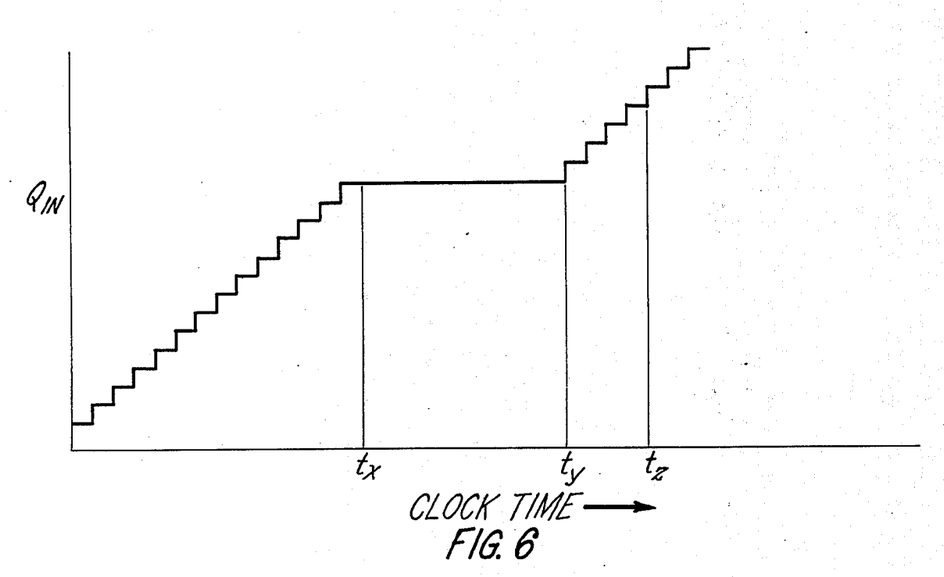
FIG. 6. graphically illustrates program control of reactor heat input when batch temperature lags the programed set point temperature.

FIG. 5 graphically depicts the situation where batch temperature $T_A$ begins to lag the set point temperature $T_E$ at time $t_x$. FIG. 6 depicts program control of reactor heat input $Q_{in}$ as a function of clock time throughout the period depicted in FIG. 5.

Referring to FIGS. 2d, 2e, 5 and 6. During step 2 of the temperature elevation phase the program continuously compares $T_A$ to $T_E$ at each process time step. As long as the batch temperature $T_A$ remains within acceptable limits the program continues to ramp reactor heat input $Q_{in}$ incrementally upward as shown in FIG. 6. Should temperature $T_A$ fall below the lower limit of $T_E$ as shown at time $t_x$ in FIG. 5, the program stops the advance of process time thereby holding reactor heat input $Q_{in}$ constant. The program however, continues to monitor $T_A$ and compare it to the last valid set point temperature $T_E$. Once $T_A$ returns to the set point temperature the program resumes advancing process time and the sequential ramping of reactor heat input upward as shown in FIG. 6. The time interval between $T_x$ and $t_y$ represents last processing time.

Figure 7:
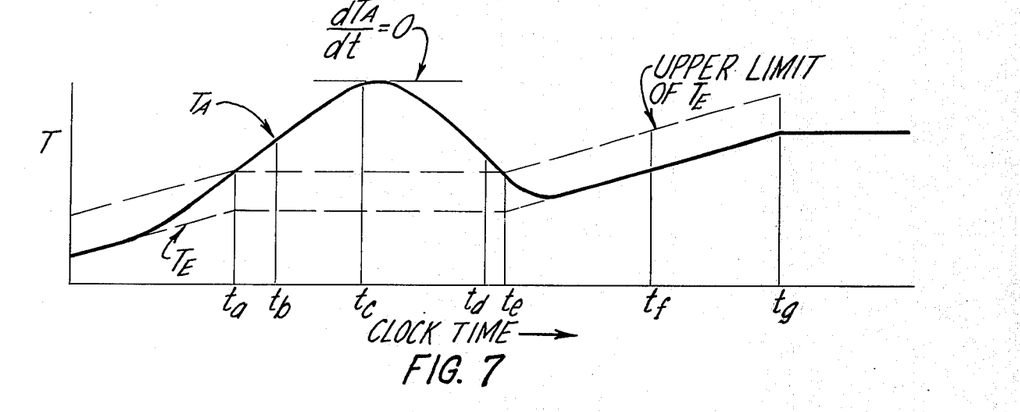
FIG. 7. is a graphical illustration depictng the condition where batch temperature exceeds the programed set point temperature.
Figure 8:
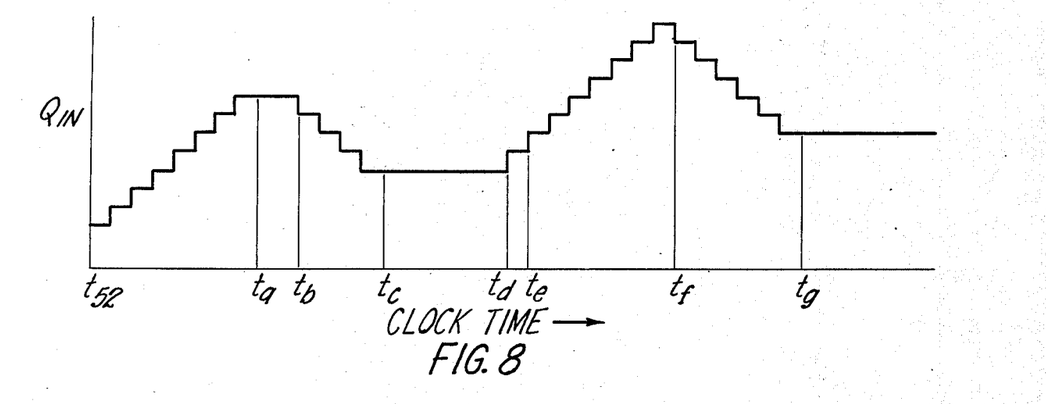
FIG. 8 graphically illustrates program control of reactor heat input when batch temperature exceeds the reactor set point temperature.

FIG. 7 depicts the condition where excessive exothermic reactions cause the batch temperature $T_A$ to exceed the upper limits of set point temperature $T_E$ at process time $t_a$. FIG. 8 correspondingly depicts program control of reactor heat input $Q_{in}$ as a function of clock time throughout the period depicted in FIG. 7.

Referring to FIGS. 2d, 2e, 7 and 8. If batch temperature $T_A$ exceeds the upper limit of the reactor set point temperature $T_E$ as shown at point $t_a$ in FIG. 7 the program stops the advance of process time thereby holding reactor heat input $Q_{in}$ constant for a fixed clock time period. During this period the program determines batch temperature $T_A$ trend by comparing successive temperature readings. If the batch temperature $T_A$ stops rising and begins a return to the reactor set point value $T_E$ the program maintains its hold status until $T_E$ is within acceptable limits and then resumes its programmed incremental ramping of $Q_{in}$.

If the batch temperature $T_A$ does not stop rising during this observation period the program begins incrementing $Q_{in}$ downward (point $t_b$ in FIG. 8) until the rate of charge of $T_A$ with respect to time $t$ equals zero (point $t_c$ in FIGS. 7 and 8). The program now holds the resulting value of $Q_{in}$ constant for another fixed real time period to determine if $Ta_A$ begins a return to the reactor set point temperature $T_E$. In the event $T_A$ does not begin to decrease during this observation period the program again starts incrementing $Q_{in}$ downward. After $T_A$ begins to decline the program monitors the difference between batch temperature $T_A$ and the target set point temperature $T_E$ the program begins to increment reactor heat input $Q_{in}$ upward (point $t_d$ of FIGS. 7 and 8) in anticipation of $T_A$ returning to within limits. Once the batch temperature is again within acceptable limits (point $t_e$ of FIG. 7) the program resumes the advance of process time and the programmed incremental increases of reactor heat input $Q_{in}$. Again the time period between $t_a$ and $t_d$ represents lost process time.

It should be noted that FIG. 8 is intended only to illustrate program control of reactor heat input. Depending upon the severity of the exothermic reaction being corrected, the program may increment reactor heat input downward through zero $Q_{in}$ and begin heat removal from the reactor. Since the program controls $Q_{in}$ by raising or lowering the temperature of the oil circulating through heat transfer coils 27 it (the program) has no direct reference of heat into or out of the reactor. The parameter $Q_{in}$ was chosen for explanitory purposes in the specification because it quantitively describes heating of the reactor regardless of the specific technique. used.

As the batch temperature $T_a$ approaches the cooking temperature $T_{53}$ the program begins to decrease reactor heat input in anticipation of entering the cook phase of the process. At $T_A = T_{53}$ the program commences the cooking phase. Reactor heat input $Q_{in}$ is adjusted to that value which has been emperically determined sufficient to maintain the cooking temperature $T_{53}$ (see FIGS. 2d and 2f). The program continues its vigilance of batch temprature $T_A$ and adjusts heat input $Q_{in}$ in order to maintain the programmed cooking temperature.

During the cook phase the reactor operator periodically samples the batch and determines the viscosity and acidity thereof. The values are then read into the program. The program stores the data as a time function and extrapolates the data to future time periods by known curve fitting techniques.

If the extrapolations predict that the viscosity or acidity of the batch will fall outside acceptable limits a computation is made to determine the additional ingredients and the amount necessary to arrive at the end point within limits. The process is completed when the polyester resin reaches a predetermined acidity and viscosity. The resin is then transferred to thining tank 81 through conduit means 40 and computer controlled valve 80. Here the resin is mixed with styrene and stared until disposition thereof.

The flow charts provided in FIG. 2 are intended only to illustrate the sequence of events during the three process phases. These charts are presented for instructional clarity only and do not depict nor necessarily represent actual soft ware programming. Many programming techniques may be employed to accomplish the spirit and scope of my invention.

I claim:

1. A programmable method for raising the temperature of a composition of matter which characteristically generates exothermic heat comprising:
   a. providing a time synchronized reference signal corresponding to a desired temperature vs. time variation pattern,
   b. applying a first rate of heat input to said composition of matter,
   c. progressively increasing the heat input rate at scheduled time intervals,
   d. sensing the temperature of said composition of matter at each time interval and providing a signal representative thereof,
   e. comparing said signal with the time synchronized reference signal corresponding to the scheduled time interval.
   f. determining any divergence of the sensed composition temperature greater than the desired temperature,
   g. imposing a programmed logic upon said heat input schedule responsive to the determined temperature divergence until the sensed composition temperature converges with the desired temperature,
   h. repeating steps c through g until the desired elevated temperature is attained.

2. In a process for producing an intermediate polyester resin by reacting at least one polyol with at least one polybasic acid, the method of elevating the reactant temperature according to a desired temperature history comprising,
   a. providing a predetermined reactant temperature vs. process time variation pattern,
   b. applying a first rate of heat input to said reactants,
   c. incrementally increasing said rate of heat input to said reactants at given process time intervals,
   d. sensing the reactants' temperature for each process time interval,
   e. determining any divergence of the sensed temperature greater than the predetermined temperature for each process time interval,
   f. modifying the heat input schedule upon determining such divergence of the sensed reactants' temperature by,
      1. incrementally reducing the rate of heat input to said reactants' at specified clock time intervals,
      2. sensing and storing the reactants' temperature for each clock time interval,
      3. comparing for each increment of clock time the sensed reactants' temperature with the previously stored temperature,
      4. repeating steps (1) through (3) until the reactants' temperature convergingly approaches the predetermined temperature for the process time interval,
   g. resuming the incremental increase of the rate of heat input to the reactants when the reactants' temperature substantially equals the predetermined temperature for the process time interval.

3. In a process for producing an intermediate polyester resin by reacting at least one polyol with at least one polybasic acid, the method of elevating the reactants' temperature according to a desired temperature history comprising,
   A. providing a desired reactant temperature-time history,
   B. applying an initial rate of heat input to said reactants,
   C. establishing a first reference time increment schedule and at each time increment thereof,
      1. increasing the rate of heat input to said reactants,
      2. sensing the temperature of said reactants, 3. comparing the sensed reactants temperature to the desired temperature for the given time increment,
4. determining any divergence of the reactants temperature above the scheduled temperature,
5. modifying the heat input program upon determining such divergence of the reactants temperature by establishing a second reference time increment schedule and at each time increment thereof,
   a. reducing the rate of heat input to said reactants,
   b. sensing and storing the reactants temperature,
   c. comparing the reactants temperature with the previously stored temperature,
   d. repeating steps (a) through (c) until the reactants temperature convergingly approaches the desired set point temperature for the first reference time increment,
   e. resume increasing the rate of heat input in accordance with said first reference time increment schedule.

* * * * *